United States Patent [19]

Gaylord

[11] Patent Number: 4,515,927

[45] Date of Patent: May 7, 1985

[54] PROCESS TO COPOLYMERIZE VINYL CHLORIDE AND CHLOROTRIFLUOROETHYLENE

[76] Inventor: Norman G. Gaylord, 28 Newcomb Dr., New Providence, N.J. 07974

[21] Appl. No.: 474,371

[22] Filed: Mar. 11, 1983

[51] Int. Cl.³ .......................................... C08F 214/24
[52] U.S. Cl. ...................... 526/87; 526/249
[58] Field of Search ................. 526/78, 79, 80, 87, 526/249

[56] References Cited

U.S. PATENT DOCUMENTS

| | | | |
|---|---|---|---|
| 2,409,948 | 10/1946 | Martin | 260/86 |
| 2,689,241 | 9/1954 | Dittman et al. | 260/87.5 |
| 2,774,751 | 12/1956 | Passino et al. | 260/87.5 |
| 2,820,026 | 1/1958 | Passino et al. | 260/92.1 |
| 2,837,505 | 6/1958 | Dittman et al. | 260/92.1 |
| 2,842,528 | 7/1958 | Herbst et al. | 260/87.5 |
| 2,888,446 | 5/1959 | Herbst et al. | 260/87.5 |
| 2,915,506 | 12/1959 | Honn et al. | 260/80.5 |
| 3,058,899 | 10/1962 | Yanko et al. | 204/158 |
| 3,163,628 | 12/1964 | Bolstad | 260/87.5 |
| 3,285,898 | 11/1966 | MacKenzie et al. | 260/92.3 |
| 3,380,977 | 4/1968 | Helfrich et al. | 260/87.5 |
| 3,406,157 | 10/1968 | Steinbach | 260/87.5 |
| 3,536,675 | 10/1970 | Fagnoni | 260/78.5 |
| 3,539,546 | 11/1970 | Steinbach | 260/92.8 |
| 3,579,491 | 5/1971 | Carrega | 260/85.5 |

FOREIGN PATENT DOCUMENTS

| | | |
|---|---|---|
| 569133 | 1/1959 | Canada . |
| 576000 | 5/1959 | Canada . |
| 584098 | 9/1959 | Canada . |
| 47-103781 | 10/1982 | Japan . |
| 705422 | 8/1950 | United Kingdom ........ 2/5 |
| 728557 | 5/1953 | United Kingdom . |
| 840735 | 10/1956 | United Kingdom ........ 2/6 |
| 795513 | 5/1958 | United Kingdom ........ 2/6 |
| 1150190 | 3/1968 | United Kingdom . |

OTHER PUBLICATIONS

Synthesis of copolymers of vinyl chloride and trifluorochloroethylene, by J. Ulbricht and K. Raessler from Plaste und Kautschuk, 22(5), 390–393, (1975).

*Primary Examiner*—Harry Wong, Jr.

[57] ABSTRACT

A process for the suspension copolymerization of vinyl chloride and chlorotrifluoroethylene to form a copolymer having a constant weight ratio of vinyl chloride and chlorotrifluoroethylene independent of conversion, which consists in polymerization with an initial charge containing excess vinyl chloride and adding additional vinyl chloride prior to reaching the conversion where the copolymer composition changes.

10 Claims, No Drawings

PROCESS TO COPOLYMERIZE VINYL CHLORIDE AND CHLOROTRIFLUOROETHYLENE

DESCRIPTION

Background of the Invention

The present invention relates to a process for copolymerization; more particularly the present invention relates to a process for the copolymerization of vinyl chloride and chlorotrifluoroethylene.

Processes to copolymerize vinyl chloride and chlorotrifluoroethylene by suspension copolymerization using a variety of free radical initiators are known. Processes are disclosed in U.S. Pat. Nos. 3,536,675; 3,539,546; and 3,579,491. In patents disclosing copolymers of vinyl chloride, chlorotrifluoroethylene is often listed in a group of alternate monomers which can be copolymerized with the vinyl chloride. Generally, the primary object of such disclosures is not the specific copolymer of vinyl chloride and chlorotrifluoroethylene but rather other copolymers.

Processes to copolymerize vinyl chloride and chlorotrifluoroethylene suffer from a major drawback in that the vinyl chloride is more reactive than the chlorotrifluoroethylene. Therefore, the tendency is for the vinyl chloride to react more rapidly and the monomer mixture rapidly becomes vinyl chloride-poor. This results in the formation of a product with a non-homogeneous composition, i.e. the polymer molecules which form early in the reaction have a different molar ratio of comonomers than those formed later in the reaction.

A process disclosed in Japanese Kokai No. 74 60,391 attempts to deal with the different reactivities of vinyl chloride and chlorotrifluoroethylene in the preparation of copolymers suitable for use in paints and having a high level of solubility and coating properties. The copolymers contain vinyl chloride and chlorotrifluoroethylene in a 30/70 to 80/20 weight ratio with preferred copolymers having a 35/65 to 65/35 weight ratio vinyl chloride/chlorotrifluoroethylene composition. The copolymers are prepared by methods which are employed in vinyl chloride copolymerization, i.e. suspension, emulsion, bulk or solution copolymerization.

Notwithstanding the method of copolymerization, the process involves an initial charge containing a large excess of chlorotrifluoroethylene, followed by the addition of more vinyl chloride either continuously or intermittently in increments essentially equal to the amount of vinyl chloride charged initially. Due to the large excess of chlorotrifluoroethylene in the reaction mixture, the rate of polymerization is slow and in illustrative examples 1-5, conversions are less than 20% after 6 hours and less than 50% after 12 hours at 40° C., despite six incremental additions of vinyl chloride at 2 hour intervals in the 12 hour reaction period. The examples disclose that nine incremental additions of vinyl chloride and additional catalyst are needed to obtain conversions above 70% in 24 hours.

The copolymers obtained in the illustrative examples 1-5 of the Japanese Kokai contain 35 to 65 percent by weight vinyl chloride, the preferred composition for the products, and are prepared with an initial charge containing a large excess of chlorotrifluoroethylene. Comparative Example 3, yielding a copolymer containing more than 90% by weight vinyl chloride, outside of the composition claimed in the Japanese Kokai, also discloses the use of an initial charge containing excess chlorotrifluoroethylene. Due to the use of excess chlorotrifluoroethylene in all cases, extended reaction times are needed to obtain high conversions.

SUMMARY OF THE INVENTION

The present invention is a process for the suspension copolymerization of vinyl chloride and chlorotrifluoroethylene to form a copolymer having a constant weight ratio of vinyl chloride to chlorotrifluoroethylene. The suspension copolymerization is conducted by adding an initial charge having an excess of vinyl chloride to form a copolymer having a constant weight ratio of vinyl chloride to chlorotrifluoroethylene. Chlorotrifluoroethylene and an excess by weight of vinyl chloride are added to water. A catalyst is added which causes the copolymerization to take place. The reactor is preferably held at from 0° C. to 70° C. and preferably 0° C. to 60° C. The vinyl chloride and chlorotrifluoroethylene copolymerize to form the copolymer having a constant weight ratio of vinyl chloride to chlorotrifluoroethylene. Additional vinyl chloride monomer is added to the reactor prior to the reaction reaching the extent of reaction or conversion to polymer where the weight ratio of vinyl chloride to chlorotrifluoroethylene changes. For the purpose of the present invention conversion is measured as the percent by weight of copolymer based on the weight of the monomer used.

Generally, the vinyl chloride which is more reactive reacts more quickly than the chlorotrifluoroethylene. Upon adding the additional vinyl chloride the copolymerization of the vinyl chloride including the additional vinyl chloride and chlorotrifluoroethylene continues to form a copolymer having a constant weight ratio of vinyl chloride to chlorotrifluoroethylene. Optionally, more catalyst can be added as needed. The copolymer that is formed can be collected at the end of the reaction or continuously during the reaction.

The step of adding additional vinyl chloride monomer to the reactor prior to reaching the conversion where the weight ratio of vinyl chloride to chlorotrifluoroethylene changes can continually be repeated. Alternately, additional vinyl chloride can continuously be added to the reactor at a rate of not greater than the rate at which the vinyl chloride is copolymerizing. In this way the copolymer of vinyl chloride chlorotrifluoroethylene has a constant weight ratio throughout the reaction.

In the preferred process, the temperature is from 40° C. to 60° C. using a catalyst that has a half life of less than 20 hours.

The preferred process of the present invention is used to make a copolymer having from 75 to 95 weight percent vinyl chloride and correspondingly from 5 to 25 weight percent chlorotrifluoroethylene. Copolymers of this composition can be made in a reactor where yields of up to 75 per cent based on vinyl chloride feed are obtained.

DETAILED DESCRIPTION OF THE INVENTION

According to the present invention, the copolymerization of vinyl chloride and chlorotrifluoroethylene is carried out in suspension, using procedures applicable to the homopolymerization of vinyl chloride in suspension and well known to those skilled in the art.

The copolymerization temperature may range from 0° C. to 70° C., preferably from 35° C. to 60° C. The amount of water charged to the reactor should be sufficient to suspend the reactants and to conduct the suspension copolymerization process. Typically, the amount of water may vary from 2 to 3 times the amount of monomer initially charged to the reactor. The final volume of water and copolymer should generally be less than 75% of the volume of the reactor in order to permit adequate agitation and temperature control.

The pressure in the reactor is autogenous and, since the monomers are gaseous, it is determined by the temperature and the free volume in the reactor above the reaction mixture. Generally, the pressure is below 500 psig, with a range of 100 to 300 psig.

The types and concentrations of suspending agents are those normally used in suspension polymerization and are well known to those skilled in the art. Typical suspending agents include cellulose ethers such as methylcellulose and hydroxypropylmethylcellulose, poly(vinyl alcohol), partially hydrolyzed poly(vinyl acetate), gelatin, vinyl acetate-maleic anhydride copolymers, polymethacrylic acid and the like. Various emulsifiers such as sulfonated oil, ethylene oxide condensation products and polyol esters as well as fluorocarbon compounds may be added to control surface tension and particle shape. Buffers can be used when necessary. Chain transfer agents such as chlorinated hydrocarbons and isobutylene can be used to control the molecular weight of the copolymer.

The catalysts useful in the present invention are those which are useful in the suspension polymerization of vinyl chloride. Useful catalysts are described in Pennwalt Corporation, Lucidol Division, Technical Bulletin 30.90, "Free Radical Initiators for the Suspension Polymerization of Vinyl Chloride" and in Kamath, "New Vinyl Chloride Initiators for Improved PVC Heat Stability," Modern Plastics, February 1981, the disclosures of which are incorporated herein by reference.

Useful catalysts include peroxygen compounds such as diacyl peroxides and peroxyesters and azo compounds. The preferred free radical initiators have a half life of less than 20 hours at the polymerization temperature and include acetyl peroxide, lauroyl peroxide, t-butyl peroxypivalate, t-butyl peroxyneodecanoate, diisopropyl peroxydicarbonate, di-sec-butyl peroxydicarbonate, azobisisobutyronitrile and the like.

The concentration of catalyst is generally 0.01-5% by weight of the initial monomer charge, with a preferred concentration of 0.05-1% by weight. Additional catalyst may be added during the course of the polymerization.

Redox catalyst systems consisting of monomersoluble peroxygen compounds and inorganic or organic reducing agents may also be used. High energy radiation including gamma and electron beam radiation may also be used in the practice of this invention.

The quantities of vinyl chloride and chlorotrifluoroethylene which are initially charged into the reactor are those which form a copolymer having the desired weight ratio of comonomers within the initial 15% conversion. At 15% conversion, 15% by weight of copolymer was formed based on the weight of the monomers used. The preferred copolymer of the present invention contains vinyl chloride and chlorotrifluoroethylene in a 75/25 to 95/5 weight ratio. In order to obtain a copolymer having this weight ratio of comonomers, the weight ratio of vinyl chloride and chlorotrifluoroethylene charged into the reactor initially should be from 55/45 to 75/25. This is distinguishable from the previously cited Japanese Kokai wherein the initial charge contains an excess of chlorotrifluoroethylene.

Surprisingly, it has been found that the copolymer composition in the suspension copolymerization of vinyl chloride and chlorotrifluoroethylene at 0° C. to 70° C. and preferably at 0° C. to 60° C. does not change significantly within a conversion range of about 1 to 20% by weight, despite the rapidly changing composition of the monomer mixture and the greater reactivity of the vinyl chloride. However, the rate of polymerization and the copolymer composition change at about 20% conversion.

In order to maintain the relatively constant copolymer composition, additional vinyl chloride is added to the reaction mixture prior to the time when the conversion reaches the point where the copolymer composition changes. The step of adding additional vinyl chloride monomer to the reaction mixture prior to the conversion where the copolymer composition changes may be repeated as many times as desired as long as the reaction mixture contains unreacted chlorotrifluoroethylene. Alternately, the additional vinyl chloride may be added continuously to the reactor at a rate such that the relatively constant composition of the copolymer is unchanged.

Since the concentration of chlorotrifluoroethylene in the reactor is continually being decreased as a result of copolymerization, the amount of additional vinyl chloride to be added is also continually decreased in order to maintain a relatively constant copolymer composition.

In order to determine the amount of additional vinyl chloride to be added after the initial charge, the time to a conversion up to 20% conversion is predetermined at the desired reaction temperature, with a given vinyl chloride-chlorotrifluoroethylene ratio and catalyst concentration. The composition of the residual monomers in the reaction mixture at the selected conversion is calculated from the copolymer composition. The amount of vinyl chloride necessary to reconstitute the initial vinyl chloride-chlorotrifluoroethylene charge is calculated from the residual unreacted monomers and is added at the predetermined time for the selected conversion. Additional vinyl chloride is added incrementally based on the residual monomer composition at each conversion interval.

In lieu of continually repeating the step of adding vinyl chloride to the reaction mixture prior to the conversion at which the composition of the copolymer changes, vinyl chloride can be added continuously to the reactor at a rate not greater than the rate at which the vinyl chloride is copolymerized.

Alternately, a sample of the contents of the reactor may be removed and analyzed periodically without regard to any preset schedule to determine the residual monomer composition and/or the copolymer composition. The amount of vinyl chloride necessary to reconstitute the composition of the initial charge may then be added without regard to any predetermined equal conversion interval.

The conversion per unit time is a function of the reaction temperature and the initiator concentration. Therefore, by appropriate choice of these variables and the rate of vinyl chloride addition, conversions of up to 85% may be achieved in less than 10 hours while retaining the homogeneous composition of the copolymer.

Despite the use of excess vinyl chloride in the initial charge, the significantly greater reactivity of vinyl chloride as compared with chlorotrifluoroethylene and the continuous or intermittent addition of vinyl chloride, it has been found that no polyvinyl chloride chains nor copolymers having a vinyl chloride content significantly higher than the desired amount are formed. The composition of the copolymer formed between successive additions of vinyl chloride remains relatively unchanged.

The copolymer made by the process of the present invention can be used to make melt fabricated articles such as film, injection molded parts, and extruded profiles including tubing and wire coating.

The following examples are illustrative embodiments of the practice of the present invention and are not to be construed as limitations on the invention or the claims. Numerous modifications in procedure and equipment will be obvious to those skilled in the art.

GENERAL PROCEDURE

The copolymerization of vinyl chloride and chlorotrifluoroethylene was carried out in a 1-liter, round-bottom stainless steel autoclave having an internal volume of 750 ml. The autoclave was charged with the suspension recipe consisting of water and a suspending agent such as 15 cps viscosity grade methylcellulose (Methocel A-15, Dow Chemical Co.) or hydroxypropylmethylcellulose (Methocel E-15, Dow Chemical Co.). When desired, emulsifying agents such as sorbitan monostearate (Span 60, ICI Americas Inc.) and/or polyoxyethylene sorbitan monostearate (Tween 60, ICI Americas Inc.) were also charged into the autoclave. The suspending and emulsifying agents were added as 1% aqueous solutions. The suspension recipe was deaerated by bubbling nitrogen through the aqueous solution in the autoclave for 5 minutes. The catalyst was then added and the cover containing the stirrer, cooling coil, thermocouple and pressure gauge was placed on the autoclave for further charging in the closed system.

Vinyl chloride (VC) was passed through columns containing sodium hydroxide pellets and silica gel and condensed in a weighed 500 ml stainless steel cylinder immersed in a dry ice-acetone bath. Liquified chlorotrifluoroethylene (CTFE) was similarly collected in a weighed stainless steel cylinder.

The autoclave containing the deaerated aqueous solution was sealed and cooled in a dry ice-acetone bath to freeze the contents. The cylinders containing VC and CTFE were also cooled in a dry ice-acetone bath.

The autoclave containing the frozen solution was evacuated by attachment to a high vacuum pump. The cooled small cylinder containing liquid VC was quickly attached to the evacuated autoclave through a valve and tubing at one end of the small cylinder and to a nitrogen cylinder through a valve and tubing at the other end of the small cylinder. Under the positive pressure of nitrogen, the liquid VC was quickly charged into the autoclave. The empty VC cylinder was removed and replaced by the small cylinder containing liquid CTFE. The latter was charged into the autoclave under nitrogen pressure. The empty CTFE cylinder was removed and the sealed autoclave was kept in the bath at −78° C. to liquify the gas mixture. The gaseous nitrogen which entered the autoclave during the charging was released through a valve. The autoclave was removed from the dry ice-acetone bath and placed in a cold water bath. After about 1.5 hours the stirrer was readily turned, indicating that the frozen aqueous solution had melted and the pressure gauge registered 35 to 80 psig depending upon the temperature. The autoclave was mounted on its stand and the cooling coils were connected to the constant temperature bath through a solenoid.

The stirrer was maintained at 100-300 rpm and the temperature regulator was set at the desired temperature in the 35° C. to 60° C. range.

After the desired reaction period, e.g. 2 hours, additional weighed liquified VC was charged from the reloaded small cylinder into the autoclave under nitrogen pressure. The addition of liquified VC was repeated one or more times after additional reaction periods, if desired. After the total reaction period, the heating was stopped and cold water was circulated through the cooling coil to reduce the temperature of the reaction mixture to about 30° C.

The autoclave was connected to an empty evacuated cylinder immersed in a dry ice-acetone bath and, after the valve on the autoclave was opened, the unreacted VC and CTFE were released and condensed in the cylinder. When the pressure gauge indicated the absence of pressure, the cover of the autoclave was removed.

The polymer, in the form of beads or granules, suspended in the aqueous phase was filtered under aspirator vacuum and the recovered polymer was washed with methanol, dried in vacuo at 40° C. for 16 hours. The copolymer composition was determined from the fluorine analysis.

EXAMPLE 1

This example is outside of the scope of the invention and demonstrates the low conversion obtained when additional VC is not added.

The suspension recipe consisting of 13.5 ml 1% aqueous Tween 60 solution, 13.5 ml 1% aqueous Span 60 solution, 27.0 ml 1% aqueous Methocel A-15 solution and 284.2 ml water was charged into the autoclave and deaerated with nitrogen. The catalyst, 0.135 g di-sec-butyl peroxydicarbonate (DsBPDC) (0.08 wt-% on monomers), was added to the autoclave which was then sealed, cooled in a dry ice-acetone bath and evaluated. The liquid monomers, 101.7 g VC and 67.5 g CTFE (59.8/40.2 wt ratio VC/CTFE), were charged into the autoclave under nitrogen pressure. The autoclave was again cooled to liquefy the monomers and the nitrogen was released. The autoclave was allowed to warm to 25° C. and the internal coil was connected to a constant temperature circulating bath maintained at 40° C. The temperature of the contents of the autoclave rose to 35° C. with a pressure of 80 psi in 5 min, and to 40° C. with a pressure of 95 psi in an additional 10 min. The copolymerization was conducted at 41° C. under a pressure of 100-104 psi for 3 hours. The autoclave was then cooled, vented and opened. The contents were filtered and the isolated beads were washed with methanol and dried in vacuo at 40° C. for 16 hours. The copolymer weighed 21.5 g (12.7% yield).

EXAMPLE 2

This reaction was carried out in the presence of suspending and emulsifying agents, and the VC was added in three stages.

A deaerated suspension recipe consisting of 13.4 ml 1% aqueous Tween 60 solution, 13.4 ml 1% aqueous Span 60 solution, 26.8 ml 1% aqueous Methocel A-15 solution and 282.6 ml water was charged into the autoclave. Then 4 g VC/CTFE copolymer beads from Example 1 were added as a seed, followed by 0.135 g DsBPDC (0.08 wt-% on monomers). The autoclave was sealed and 100.7 g liquid VC and 67.5 g liquid CTFE (60/40 VC/CTFE wt ratio) were charged under nitrogen pressure. After charging, the autoclave pressure was 105 psi at 29° C. After connection of the heating-cooling coils to 40° C. circulating bath, the temperature and pressure rose to 40° C. and 130 psi, respectively. After 2 hours, 21.4 g VC was introduced under nitrogen pressure. The pressure in the autoclave increased to 170 psi at 41° C. After an additional 2 hours, 19.6 g VC was introduced under nitrogen pressure and increased the autoclave pressure to 195 psi at 42° C. After 2 hours (total reaction time 6 hours) the autoclave was cooled to 25° C. and unreacted monomers were vented. The copolymer was isolated as beads and weighed 92.1 g (44.0% yield). Fluorine analysis indicated that the beads had an 85/15 wt ratio VC/CTFE composition. The three-stage VC addition resulted in an improved yield.

EXAMPLE 3

This reaction was carried out in the absence of emulsifying agents with a preheated suspending agent solution and VC added in two stages.

The water from the 40° C. circulating bath was passed through the internal coil in the autoclave before charging. A deaerated suspension recipe consisting of 27.5 ml 1% aqueous Methocel A-15 solution and 316.5 ml water was heated to 65° C. and charged into the autoclave, followed immediately by the addition of 0.135 g DsBPDC (0.08 wt-%). The autoclave was sealed and 91.3 g VC and 60.7 g CTFE (60/40 wt ratio VC/CTFE), previously condensed in small cylinders, was charged under nitrogen pressure. The pressure inside the autoclave was 135 psi at 40° C.

After the reaction was conducted for 2 hours at 40° C., 19.5 g liquefied VC was charged into the autoclave under nitrogen pressure. The pressure rose to 142 psi at 40° C. After 2 hours at 40° C. under 142 psi pressure, the reaction mixture was cooled to 35° C. The autoclave was opened and the granular copolymer was collected by filtration, washed with methanol and dried. The copolymer weighed 42.7 g (24.9% yield) and had an 85/15 weight ratio VC/CTFE composition.

EXAMPLE 4

This reaction was conducted with an emulsifier-free suspension system and VC added in five stages.

After 30.8 ml 1% aqueous Methocel E-15 solution and 355.2 ml deaerated water were charged to the autoclave, 0.159 g DsBPDC (0.12% on monomers) was added. The autoclave was closed and 79.8 g liquid VC and 53.3 g liquid CTFE (VC/CTFE 60/40 wt ratio) were charged to yield an autoclave pressure of 80 psi at 25° C. After circulating 40° C. water through the coils, the pressure rose to 120 psi at 40° C. in 20 min. After 2 hours at 40° C., the pressure was 120 psi and 17.0 g VC was introduced and increased the pressure to 130 psi at 40° C. After an additional 2 hours at 40° C., 15.0 g VC was added and the pressure rose to 134 psi at 40° C. After an additional 2 hours (total 6 hours), 14.5 g VC was charged and the pressure rose to 155 psi at 42° C. The temperature was reduced to 40° C. in 10 min by circulating cold water through the coils and the pressure dropped to 150 psi. After 2 hours (total 8 hours) 13.2 g VC was added and the autoclave pressure was 160 psi at 40° C. After another 2 hours (total 10 hours) the pressure remained at 160 psi at 40° C. and the autoclave was cooled. The unreacted monomer was vented, recovered and the autoclave was opened. The tightly packed beads were removed, washed with methanol and dried. The copolymer beads weighed 129 g (66.9% yield based on total monomer charged). Fluorine analysis indicated an 80/20 wt ratio VC/CTFE composition. The copolymer was fractionated into three fractions by solution in tetrahydrofuran and precipitated by dropwise addition of methanol. The VC/CTFE weight ratio of the copolymers in the three fractions ranged from 78/22 to 82/18. No polyvinyl chloride was detected. The glass transition temperature of the VC/CTFE copolymer was measured as 34.0° C. using a Differential Scanning Calorimeter. Pure polyvinyl chloride has a glass transition temperature of 87° C. The intrinsic viscosity of the unfractionated copolymer was 1.04 dl/g in cyclohexanone at 25° C. representing a molecular weight of 68,400.

EXAMPLE 5

This reaction was conducted with an emulsifier-free suspension system and five-stage VC addition. Further, additional catalyst was added with the fourth stage VC addition.

A solution of 19.1 ml 1% aqueous Methocel E-15 solution in 291.1 ml water was deaerated and charged into the autoclave, followed by 0.116 g DsBPDC (0.077 weight % on monomers). After 89.8 g liquid VC and 60.1 g liquid CTFE (VC/CTFE wt ratio 60/40) were charged into the autoclave, the pressure was 90 psi at 25° C. After circulating 40° C. water through the cooling coil, the pressure reached 120 psi at 40° C. in 15 min. After 2 hours at 40° C., 19.3 g VC was charged into the autoclave under nitrogen pressure and the autoclave pressure rose to 125 psi at 40° C. After an additional 2 hours at 40° C., 17.8 g VC was added and the pressure increased to 135 psi at 40° C. After an additional 2 hours (total 6 hours) 16.3 g VC was introduced and the pressure became 160 psi at 41° C. At this time 0.049 g DsBPDC (total 0.165 g, including initial charge) was injected into the autoclave. The pressure remained at 160 psi at 40° C. for 50 min after the catalyst addition, rose to 162 psi at 43° C. in the next 30 min and to 175 psi at 48° C. in the next 30 min. Cold water was circulated through the coils to bring the temperature down to 40° C. and the pressure to 160 psi. After 10 min (2 hours after fourth VC addition, total 8 hours) 14.8 g VC was introduced and the pressure and temperature were 175 psi and 42° C., respectively. After another 2 hours (total 10 hours) the pressure was 175 psi at 42° C. and the autoclave was cooled and vented. The copolymer was in the form of beads tightly packed around the coil and, after filtration, washing and drying, weighed 177 g (81.2% yield based on total monomer charged). Fluorine analysis indicated that the beads had an 80/20 wt ratio VC/CTFE composition. The intrinsic viscosity was 1.025 dl/g in cyclohexanone at 25° C. representing a molecular weight of 66,300. Fractionation of the copolymer by solution in tetrahydrofuran and precipitation by the dropwise addition of methanol indicated the absence of polyvinyl chloride and the three fractions that were recovered had VC/CTFE weight ratios in the range of 82/18 to 85/15. The glass transition of the VC/CTFE copolymer was measured to be 33° C. using a Differential Scanning Calorimeter.

EXAMPLE 6

This reaction was carried out in the presence of emulsifying and suspending agents at 35° C. with three stage VC addition.

The deaerated suspension recipe consisting of 13.4 ml 1% aqueous Tween 60 solution, 13.4 ml 1% aqueous Span 60 solution, 26.8 ml 1% aqueous hydroxypropylmethylcellulose Methocel E-15 solution and 281.9 ml water was charged into the autoclave, followed by 0.135 g DsBPDC (0.08 wt-% on monomers). The autoclave was sealed and charged with 100.7 g liquid VC and 67.1 g liquid CTFE (60/40 VC/CTFE wt ratio) under nitrogen pressure. The autoclave pressure was 100 psi at 28° C. After connecting the coils to the 35° C. circulating bath, the mixture attained a temperature and pressure of 35° C. and 125 psi, respectively, after 20 min. After 2 hours at 35° C., 21.3 g VC was added under nitrogen pressure to increase the autoclave pressure to 145 psi at 35° C. After an additional 2 hours, 19.7 g VC was added under pressure and increased the autoclave pressure to 155 psi at 35° C. After 2 hours (total reaction time 6 hours) the autoclave was cooled to 25° C. and vented. The copolymer beads weighed 36.2 g (17.3 weight % yield based on total monomers change). Fluorine analyses indicated that the beads had an 89/11 wt ratio VC/CTFE composition.

EXAMPLE 7

This reaction was similar to Ex. 6 except that the temperature was 40° C. and the initial VC/CTFE weight ratio was 70/30.

The suspension recipe consisting of 11.4 ml 1% aqueous Tween 60 solution, 11.4 ml 1% aqueous Span 60 solution, 22.8 ml 1% aqueous Methocel E-15 solution and 239.1 ml water was charged to the autoclave and deaerated, followed by 0.116 g DsBPDC (0.08 wt-% based on monomers). After charging 99.7 g VC and 42.6 g CTFE (VC/CTFE wt ratio 70/30), the autoclave pressure was 95 psi at 22° C. After circulating 40° C. water through the coils, the pressure was 125 psi at 40° C. in 15 min. After 2 hours at 40° C., 20.1 g VC was introduced and increased the pressure to 150 psi at 41° C. After an additional 2 hours at 40° C., 16.4 g VC was added and the pressure increased to 155 psi at 41° C. After 2 hours (total reaction time 6 hours) the autoclave was cooled, 63 g unreacted monomers were vented and 61.8 g copolymer (34.6% yield based on total monomers changed) was recovered in the form of beads with a negligible amount of film. Fluorine analysis indicated that the beads had a 90/10 wt ratio VC/CTFE composition.

EXAMPLE 8

This example is outside of the scope of the invention and demonstrates that a higher conversion may be obtained after 2 hours at 50° C.

An emulsifier-free suspension recipe consisting of 330.2 ml deaerated water and 28.9 ml of a 1% aqueous hydroxypropylmethylcellulose Methocel E-15 solution was charged to the autoclave, followed by 0.143 g DsBPDC (0.08 weight-% on monomers). In the usual manner, this was followed by the addition of 116.6 g liquified VC and 62.7 g liquified CTFE (VC/CTFE weight ratio 65/35) under nitrogen pressure. The autoclave pressure was 200 psi at 24° C. and 260 psi at 50° C. After 2 hours at 50° C. the pressure was 270 psi. The copolymer beads were recovered in a yield of 28.2 g (15.7% yield) and had an 85/15 weight ratio VC/CTFE composition.

The high yield after 2 hours at 50° C. indicates that it would be feasible to obtain at least an 85% yield of the desired copolymer within 8 hours, with multiple additions of VC at 30–60 minute intervals, using the process of the present invention.

What is claimed is:

1. A process for the suspension copolymerization of vinyl chloride and chlorotrifluoroethylene to form a copolymer having a constant weight ratio of vinyl chloride to chlorotrifluoroethylene comprising the steps of:
   suspension copolymerizing vinyl chloride and chlorotrifluoroethylene using an initial charge having a weight ratio of vinyl chloride to chlorotrifluoroethylene of 55/45 to 75/25 to form a copolymer having a constant weight ratio of 75/25 to 95/5 vinyl chloride to chlorotrifluoroethylene; and
   adding sufficient additional vinyl chloride to reconstitute the initial ratio of the vinyl chloride to chlorotrifluoroethylene charge prior to reaching 20% conversion.

2. The process as recited in claim 1 wherein the step adding additional vinyl chloride is repeated a plurality of times.

3. The process as recited in claim 1 where the additional vinyl chloride is added continuously.

4. The process of claim 1 wherein the additional vinyl chloride is added in sufficient quantity to copolymerize from 1 to 20 percent by weight of the unreacted monomers prior to the next addition of vinyl chloride.

5. The process of claim 1 wherein the amount of vinyl chloride added in each successive addition is less than the prior incremental amount.

6. The process of claim 1 wherein the polymerization temperature is from 0° C. to 60° C.

7. The process of claim 1 wherein the copolymerization is carried out in the presence of a free radical initiator having a half life of less than 20 hours at the polymerization temperature.

8. The process as recited in claim 1 wherein additional vinyl chloride is added prior to reaching the conversion where the weight ratio of the vinyl chloride and chlorotrifluoroethylene in the copolymer changes.

9. The process as recited in claim 1 wherein the additional vinyl chloride is added prior to reaching 15% conversion.

10. A process for the suspension copolymerization of vinyl chloride and chlorotrifluoroethylene to form a copolymer having a constant weight ratio of vinyl chloride to chlorotrifluoroethylene comprising the steps of:
    adding water, a suspension agent, chlorotrifluoroethylene, and vinyl chloride and chlorotrifluoroethylene having a weight ratio of vinyl chloride to chlorotrifluoroethylene of 55/45 to 75/25;
    adding a catalyst;
    suspension copolymerizing the vinyl chloride and chlorotrifluoroethylene to form a copolymer having a constant weight ratio of 75/25 to 95/5 vinyl chlorotrifluoroethylene;
    adding sufficient additional vinyl chloride to reconstitute the ratio of the initial vinyl chloride to chlorotrifluoroethylene prior to reaching 20% conversion; and
    continuing to suspension copolymerizing the vinyl chloride including the additional vinyl chloride and chlorotrifluoroethylene to form the copolymer having a constant weight ratio of vinyl chloride to chlorotrifluoroethylene.

* * * * *